May 3, 1927.

F. J. OVEN

GASKET

Filed Dec. 31, 1921

1,626,962

Inventor
Frank J. Oven
Attorneys

Patented May 3, 1927.

1,626,962

UNITED STATES PATENT OFFICE.

FRANK J. OVEN, OF CHICAGO, ILLINOIS, ASSIGNOR TO VICTOR MANUFACTURING & GASKET CO., OF CHICAGO, ILLINOIS, A CORPORATION OF ILLINOIS.

GASKET.

Application filed December 31, 1921. Serial No. 526,163.

My invention relates to a gasket and has in contemplation, particularly, an improved form of gasket for sealing the joint between the supply or exhaust manifold of an internal combustion engine and the cylinder block of the engine, or between similar ported engine or machine parts requiring a sealed joint.

The type of gasket which this invention is designed particularly to improve upon is made principally of sheet metal, such as copper, and comprises an annular, hollow or channeled body that is intended to lie between the engine parts to be connected, for example, between the manifold and the cylinder block, and which contains, preferably, a body of asbestos, or like compressible material, such annular body being formed with oppositely extending flanges that project into the manifold and cylinder block ports, respectively.

The principal object of this invention is to improve upon gaskets of this general type by providing certain novel constructions whereby the effectiveness of the gasket as a seal is bettered; whereby the gasket as a whole, but with respect particularly to the projecting flanges thereof, is strengthened and rigidified as against the danger of being crushed and bent in handling and such rigidification accomplished without seams, recesses or parts likely to be expanded or distorted by the gases passing through the gasket; and whereby the gasket is adapted to take a grip or hold upon one of the parts, for example, the manifold, into which it is inserted so as to facilitate the attachment of this part to the other engine or machine part with which it is assembled.

The invention is illustrated, in a preferred embodiment, in the accompanying drawing, wherein—

Figure 1:
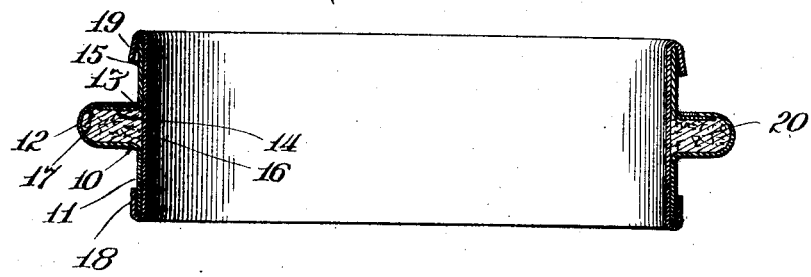
Fig. 1 is a cross sectional view of the gasket on a magnified scale.
Figure 2:
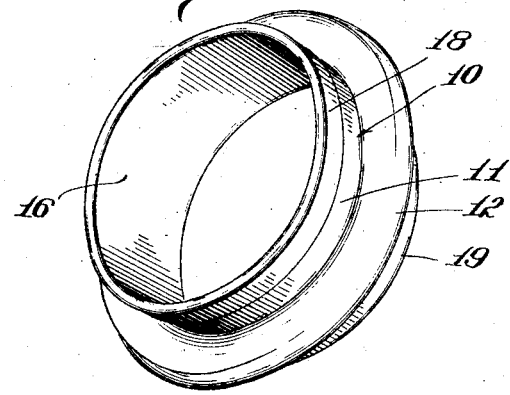
Fig. 2 is a view, in perspective, of the gasket.

Referring to the drawing, the gasket consists, in its preferred embodiment, of a channeled, annular structure provided with lateral flanges and of an integral or seamless ring member arranged within said channeled structure. The channeled structure is composed preferably of two parts or members, a member 10, formed with an outstanding flange 11 and a channeled portion 12, and of a member 13 comprising an outstanding flange 14 which extends within the channeled portion 12 of the other member, and a lateral flange 15. The ring or reinforcing member 16 is arranged within members 10 and 13 and extends across the channel 17 and across both of the flanges 11 and 15. Preferably the edges 18 and 19 of the ring 11 are bent over the edges of flanges 11 and 15, respectively. These bent over edges may be pressed down flat upon the flanges, as is the case with the bent over edge 18, but preferably one edge, at least, is not pressed down upon the sub-jacent flange but is allowed to stand at a slightly oblique angle thereto, as indicated with some exaggeration, in the case of the bent over edge 19. The channel 17 is preferably filled with some compressible material not liable to deterioration when heated. Preferably this filler is composed of a body of asbestos 20.

Figure 3:
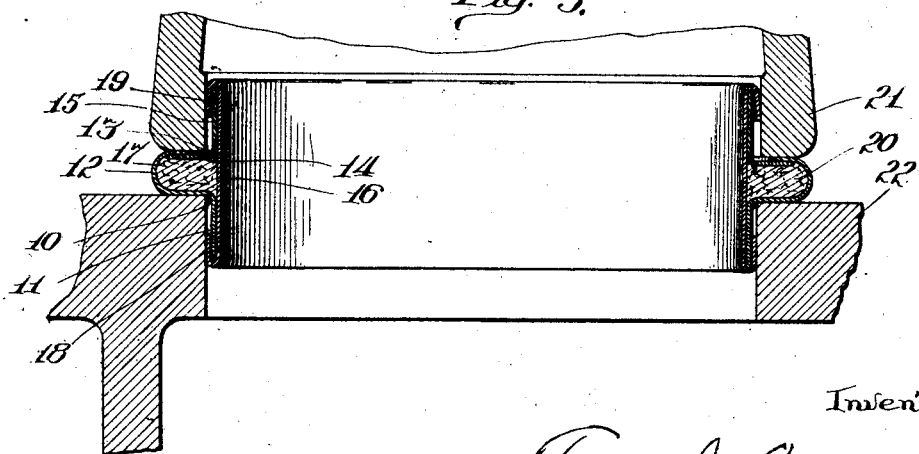
Fig. 3 is a sectional view of portions of an internal combustion engine, manifold and cylinder block showing the gasket in place between these engine parts.

In Fig. 3, 21 indicates a portion of the supply or exhaust manifold of an internal combustion engine and 22 the cylinder block. The gasket is arranged between these engine parts so that the channel portion thereof is tightly compressed when the manifold is clamped or otherwise fastened to the cylinder block.

In assembling the manifold it is customary to first put the gasket into the manifold port and then attach the manifold to the cylinder block, inserting the outstanding flange of the gasket into the cylinder block port. By having the outer edge of the gasket flange which goes into the manifold port of three ply construction, and particularly by having the overlapped edge of the ring 11 upstanding a trifle from the body of the flange, as indicated at 19 (Fig. 1), the gasket will fit the manifold tightly enough so that it is not likely to fall out when the manifold is being assembled. The two ply construction of the lateral flanges of the gasket, and the beaded or three ply construction at their edges, give very considerable strength and rigidity to the flanges so that they are not easily crushed, bent or distorted. As the gasket fits rather tightly into the cylinder block the flange on this side of the gasket is likely to be bent or crushed when the manifold is assembled with the cylinder block, unless the edge of the flange is strongly reinforced. The ring 11 extends across the channel containing the asbestos filler, and across both lateral flanges so that the interior of the gasket presents a smooth, unbroken, seamless surface which insures a perfect seal of the joint between the engine parts.

While I have described my invention in a preferred embodiment, it will be understood that structural modifications may be made without departing from the principle of the invention as defined in the appended claims.

I claim:

1. In a gasket, the combination with an annular structure having a circumferential recess for a filling material and formed with laterally projecting flanges of equal diameter, of an interiorly arranged ring member extending across said recess and both flanges and in engagement with both flanges over its axial length, and beaded over the edges of the flanges.

2. In a gasket, the combination with an annular structure having a circumferential recess for a filling material and formed with laterally projecting cylindrical flanges of equal diameter, of an interiorly arranged ring member extending across said recess and one of said flanges in engagement therewith over the entire height of said flange and bent around so as to overlap the edge of said flange and means for securing said ring member to the other flange.

3. In a gasket, the combination with an annular structure having a circumferential recess for a filling material and formed with laterally projecting flanges, of an interiorly arranged ring member extending across said recess and one of said flanges with its edge bent over the edge of said flange to stand at a slightly oblique angle thereto, for the purpose described.

4. In a gasket, the combination with an annular circumferentially channeled structure having outstanding flanges of equal diameter, of an interiorly arranged ring member extending across said channel and one of said flanges and in engagement therewith over the entire height of said flange, with its edge bent over the edge of said flange, the bend portion of the ring being in engagement with the edge of said outstanding flange.

5. In a gasket, the combination of three annular metal members; one formed with a channeled portion and a lateral flange, another with an outstanding flange extending into said channeled portion and with a lateral flange; and the third arranged within the other two and having edges which overlap, respectively, the edges of said flanges.

6. In a gasket, the combination with an annular structure having a circumferential recess and formed with laterally projecting flanges, of a seamless reinforcing member arranged within said annular structure with its edges overlapping the edges of said flanges.

7. In a gasket, the combination with an annular structure having a circumferential recess and formed with laterally projecting flanges of equal diameter, of a seamless reinforcing member arranged within said annular structure and engaging said laterally projecting flanges each on opposite sides of the same.

FRANK J. OVEN.